United States Patent
Kurisko et al.

(10) Patent No.: US 7,174,130 B2
(45) Date of Patent: Feb. 6, 2007

(54) SECURITY APPARATUS AND METHOD DURING BLUETOOTH PAIRING

(75) Inventors: Mark A. Kurisko, Orefield, PA (US); Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 832 days.

(21) Appl. No.: 09/949,673

(22) Filed: Sep. 12, 2001

(65) Prior Publication Data

US 2003/0050009 A1    Mar. 13, 2003

(51) Int. Cl.
*H04B 7/00* (2006.01)

(52) U.S. Cl. .................. 455/41.2; 455/411; 713/300

(58) Field of Classification Search ........... 455/41.1, 455/41.2, 41.3, 69, 410, 13.4, 117, 127.1, 455/127.5, 330, 278, 343.1, 522, 411; 713/300
See application file for complete search history.

(56) References Cited

U.S. PATENT DOCUMENTS 6,148,205 A * 11/2000 Cotton .................. 455/435.1
6,775,558 B1 * 8/2004 Ranta et al. ............ 455/557
6,928,295 B2 * 8/2005 Olson et al. ............ 455/522
2001/0051530 A1 * 12/2001 Shiotsu et al. .......... 455/522
2002/0025042 A1 * 2/2002 Saito ..................... 380/258

* cited by examiner

*Primary Examiner*—Duc Nguyen
*Assistant Examiner*—Aung T. Win

(57) ABSTRACT

A BLUETOOTH device is provided wherein the output RF transmission power level during pairing is purposefully reduced from otherwise conventional or normal communication levels to a low power level, greatly reducing the range of possible interception. Security can be improved even more by further reducing the transmit power even below that defined for a class 2 radio to an extremely low power level. After the link keys have been passed and/or other pairing processes, the BLUETOOTH devices may safely return to normal power levels to continue communications. In an alternative embodiment, a BLUETOOTH device may be required to transmit data keys (e.g., a link key) and/or other pairing operations over a temporary wired connection (or temporary line-of-sight or near line-of-sight connection such as infrared) to another BLUETOOTH device.

18 Claims, 7 Drawing Sheets

SECURITY APPARATUS AND METHOD DURING BLUETOOTH PAIRING

BACKGROUND OF THE INVENTION

1. Field of the Invention

This invention relates generally to piconet wireless networks. More particularly, it relates to a more secure pairing process in a piconet network such as a BLUETOOTH™ type piconet network.

2. Background

Piconets, or small wireless networks, are being formed by more and more devices in many homes and offices. In particular, a popular piconet standard is commonly referred to as a BLUETOOTH™ piconet. Piconet technology in general, and BLUETOOTH technology in particular, provides peer-to-peer communications over short distances.

The wireless frequency of the piconets may be 2.4 GHz as per BLUETOOTH standards, and/or typically have a 20 to 1000 foot range. The piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH™ protocols. BLUETOOTH network technology may be utilized to implement a wireless piconet network connection (including scatternet). The BLUETOOTH standard for wireless piconet networks is well known, and is available from many sources, e.g., from the web site www-.bluetooth.com.

As part of an initial communication between BLUETOOTH devices, the BLUETOOTH devices within range of one another perform what is known in the art as "pairing".

FIG. 7 depicts a conventional BLUETOOTH device 500.

In particular, as shown in FIG. 7, a conventional BLUETOOTH device 500 includes a processor or logic device 508 (e.g., a microprocessor, a microcontroller, or a digital signal processor (DSP)), and a BLUETOOTH front end 504. Moreover, the BLUETOOTH device 500 includes a unique 48-bit BD_ADDR 502, and a table 506 containing a list of paired BLUETOOTH devices in the particular piconet. The paired device unique address table 506 may be pre-configured at the factory, or written to by a suitable user interface such as a software-based configuration module 510 allowing entry of the 48-bit address of paired devices for storage in the paired device unique address table 506.

When configuring a BLUETOOTH device in a BLUETOOTH piconet, the devices communicating on the piconet must know the specific unique 48-bit address of matching devices on the piconet. For instance, it may be desirable for entertainment devices (e.g., TV, radio, CD player, DVD player, MP3 player, etc.) having BLUETOOTH communication capabilities to communicate with one another, but it may not be desirable (nor make sense) for appliances such as a stove or refrigerator, toaster, blender, etc. having BLUETOOTH communication capabilities talk with entertainment devices.

This is particularly true since the maximum number of BLUETOOTH devices in a piconet is somewhat restricted. For instance, current BLUETOOTH standards permit one (1) master and seven (7) slaves to be active in the piconet at any one time (plus a number of BLUETOOTH devices being capable of being 'parked').

According to the standard, all BLUETOOTH devices are assigned a unique 48-bit BLUETOOTH device address (BD_ADDR). This address is derived from the IEEE802 standard, and is divided into three fields: a lower address part (LAP) comprising 24 bits; an upper address part comprising 8 bits; and a non-significant address part (NAP) comprising 16 bits. The LAP and UAP form the significant part of the 48-bit BLUETOOTH device address (BD_ADDR). The total address space obtained is $2^{32}$.

The BLUETOOTH device address (BD_ADDR) is unique for each BLUETOOTH device. The BLUETOOTH addresses are publicly known, and can be obtained by a manufacturer via MMI interactions, or, automatically, via an inquiry routine by a BLUETOOTH device. Blocks of 48-bit addresses may be assigned to various manufacturers, who in turn factory pre-configure each BLUETOOTH device to include a unique 48-bit address (BD_ADDR) as well as a table of unique 48-bit addresses of 'paired' devices which will all communicate over a common piconet.

When a user buys or replaces a BLUETOOTH equipped electronic device, the user must configure the new BLUETOOTH device for communication with relevant and desired devices in the relevant piconet. Moreover, to provide a certain level of security, the BLUETOOTH protocol provides for encryption of data passed therebetween. To this end, there are a number of different link and encryption keys currently used in BLUETOOTH, all of which are collectively referred to herein as 'data keys'.

For instance, link keys are used as authentication keys between BLUETOOTH devices, and to generate encryption keys.

A master key is used for point to multi-point communications, and may replace for a time the current link key.

A unit key is a semi-permanent, often ROM-based key generated in every single unit often only once during factory setup. Though unlikely, the unit key might be exchanged at any time.

A combination key is dependent on two BLUETOOTH devices. Each device produces and sends a random number to the other, and a new 128 bit combination key is derived using a SAFER+ algorithm. A combination key is often created toward the end of unit pairing.

A 128 bit initialization key is a link key used for a single session, and is created each time the BLUETOOTH device is initialized. An initialization key is used only when no combination keys or unit keys have been exchanged yet. An initialization key is often created toward the beginning of unit pairing.

An encryption key is derived from the current link key, and is used by an encryption engine to produce encrypted data.

FIG. 8 depicts the authentication process and subsequent link key process between two BLUETOOTH devices.

To communicate, both BLUETOOTH devices 602, 604 must share the same secret key. The secret key can be built in by manufacturers (a fixed key), or could be derived from a Personal Identification Number (PIN) or BLUETOOTH passkey.

To begin communicating with one another, the BLUETOOTH devices 602, 604 bond by having link managers in the respective devices 602, 604 verify with one another that they share a secret key through a process called authentication. While often time authentication takes place at link setup, it need not. After authentication, the link managers of the respective devices 602, 604 create and exchange a link key. The process of authentication and link key generation are collectively called BLUETOOTH bonding or pairing.

If the BLUETOOTH devices 602, 604 determine that they share the same secret key, then they go on to use their shared secret key to generate a link key and ultimately to encrypting traffic on the link.

The present inventors have appreciated that there is a weakness in the BLUETOOTH specification that might allow an adversary to steal the keys used for authentication and encryption that are intended to keep BLUETOOTH communications secure.

FIG. 9 depicts the range of wireless communications between two BLUETOOTH devices during conventional pairing operations.

In particular, FIG. 9 depicts two conventional BLUETOOTH devices 909a, 909b communicating using conventional BLUETOOTH RF messages during pairing, including the transmission of link keys. However, it is contemplated that a BLUETOOTH identity thief 902 might have a BLUETOOTH sniffer 900 be within range 950 of the BLUETOOTH devices 909a, 909b during their pairing process. The information gained by the BLUETOOTH sniffer 900 can prove disastrous to the users of the BLUETOOTH devices 909a, 909b.

For instance, an attack might be made during the initial pairing of two BLUETOOTH devices 602, 604 that enables the adversary to intercept keys over the air and thereafter eavesdrop on future connections. Though BLUETOOTH transactions used for mobile commerce (m-commerce) that require a high level of security would most assuredly have greater security imposed by a higher layer (i.e. application layer using SSL, RSA, etc.) this security weakness in BLUETOOTH makes the user vulnerable to attack in two ways. First he or she could be impersonated by one who has intercepted the device addresses and keys. Possible examples would be impersonating a person's headset and stealing cellular air time or impersonating a person's laptop and stealing dial-up network access from the cell phone or stealing address book information.

Moreover, it is possible for an unauthorized receiver to eavesdrop on information passed between two (or more) BLUETOOTH devices 602, 604. Examples of the type of information would be non-encrypted e-mail, web sites being accessed, or even which stock quotes were being requested. Though some of this may not seem very important to some, it has the potential of providing an unfair and generally illegal advantage, particularly in the corporate or business world.

One possible way around the vulnerability of BLUETOOTH devices during pairing might be for a manufacturer to provide previously and permanently paired devices, paired in the secrecy and security of the manufacturing facility. However, such predetermined and/or dedicated pairing would tend to restrict use of the BLUETOOTH devices such that they would work only with other devices sold by the same manufacturer.

There is a need for a more secure pairing technology and apparatus with respect to piconet devices in general, and BLUETOOTH™ piconet devices in particular.

SUMMARY OF THE INVENTION

In accordance with the principles of the present invention, an apparatus and method of providing security during a network establishment operation (e.g., a pairing operation of a piconet network device) comprises receiving a link key during pairing, and rejecting the received link key if transmitted at a power level above a low power threshold specifically intended for very close range communications.

A method for securely transmitting a data key from a piconet device in accordance with another aspect of the present invention comprises forcing an RF front end of the piconet device to transmit at a low power level to transmit the data key to another piconet device at the low power level. After the data key has been transmitted, the RF front end of the piconet device is reset to transmit at a normal power level for ordinary communications.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
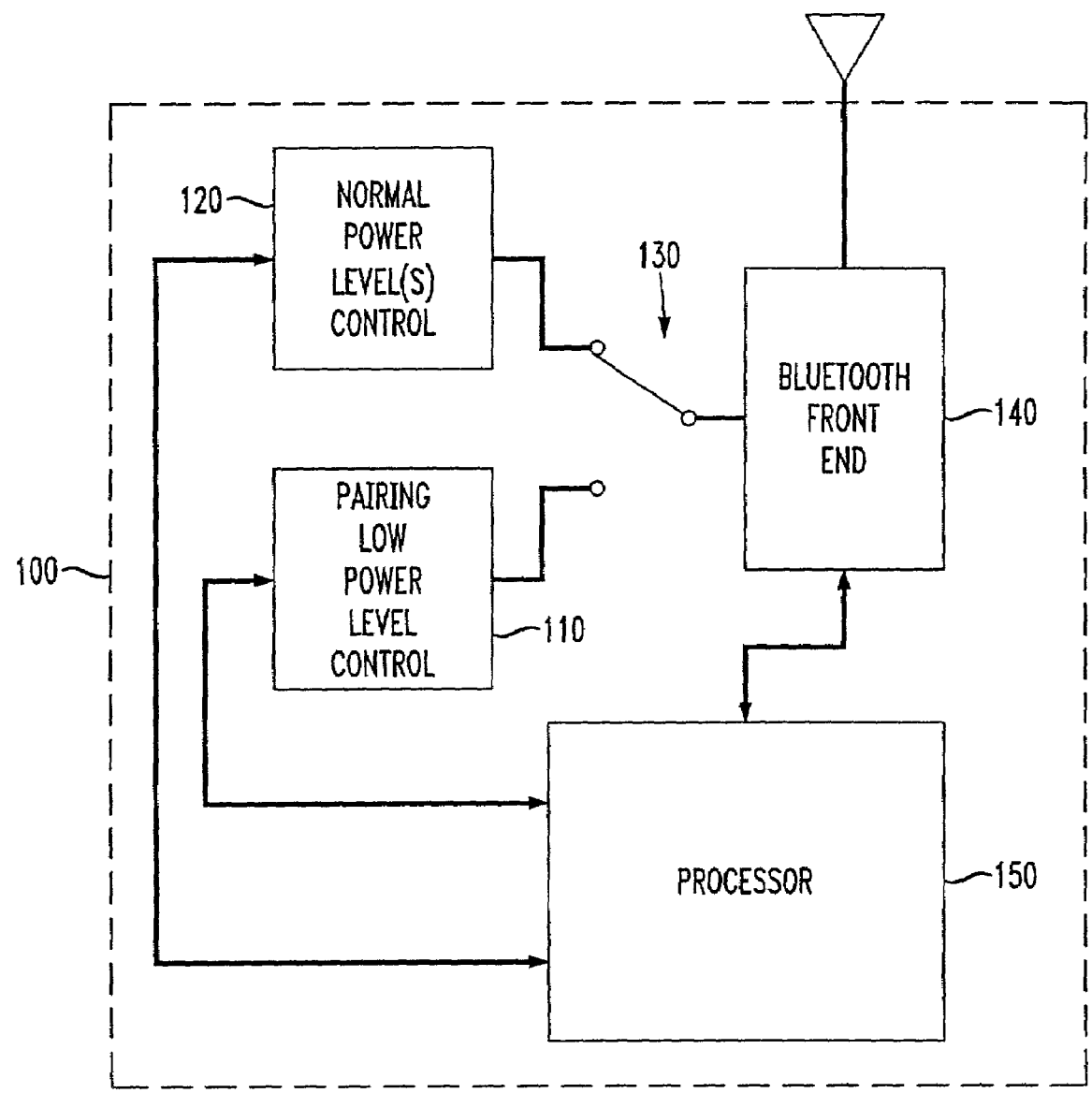
FIG. 1 shows a BLUETOOTH piconet device having a low power control for use with pairing operations including the transfer of keys, in accordance with the principles of the present invention.

If one considers the range of a class I BLUETOOTH radio, the area where one could eavesdrop on the connection is over 30,000 square meters. If the three-dimensional aspects of the radio transmission are considered (e.g., an eavesdropper on another floor of a building) the number of places an adversary could be to intercept data packets is even greater than the two dimensional consideration.

As described above, the period of time in which the BLUETOOTH device users are most particularly vulnerable is during the pairing of two BLUETOOTH devices. In accordance with the principles of the present invention, RF transmissions are seriously reduced and/or replaced during the pairing of BLUETOOTH devices, to provide added security.

The present inventors have appreciated that during pairing, it is likely that the BLUETOOTH devices are closely located anyway, or at least that a temporary requirement to bring the devices close together will probably not be a large burden. By limiting the power level of RF transmissions in a BLUETOOTH device during pairing, the range of possible interception is greatly reduced from that otherwise allowed by the current BLUETOOTH standard.

For instance, if the radio power is limited to standard low power during pairing, the possible intercepting area would be just over 300 square meters. This is only one percent (1%) of the area in which the BLUETOOTH devices are vulnerable with the conventional use of the high powered radio during pairing, and far less if considering the three dimensional aspects such as in a large building.

While the use of standard low power specifically during pairing is within the scope of the present invention, security can be improved even more by further reducing the transmit power even below that defined for a class 2 radio. For instance, by adding an additional requirement that the two devices be only a few inches apart during pairing to allowing successful pairing at very low transmit levels, risk of eavesdropping is extremely reduced from that otherwise allowed under the current BLUETOOTH standards.

In accordance with the principles of the present invention, the vulnerability is substantial during pairing operations only. Thus, after the link keys have been passed and/or other pairing processes, the BLUETOOTH devices may safely return to normal power levels to continue communications.

Thus, in accordance with the principles of the present invention, a BLUETOOTH device is forced to radiate in low power when pairing is performed.

It is also preferred that as pairing is being initiated, the BLUETOOTH device not accept temporary link keys from another BLUETOOTH device since it would be unsure what power that other device was transmitting at. Rather, it is preferred that the receiving BLUETOOTH device simply reject that pairing request, making a record of it, and then itself initiate key transfer back with that same other device in a low power mode in accordance with the principles of the present invention.

The user(s) may be directed to co-locate the pairing BLUETOOTH devices in any appropriate manner, e.g., through a display prompt on the BLUETOOTH device, through an audible instruction, through a written instruction sheet included with the BLUETOOTH device, etc.

FIG. 1 shows the relevant elements of an exemplary BLUETOOTH piconet device having a low power control for use with pairing operations including the transfer of keys, in accordance with the principles of the present invention.

In particular, as shown in FIG. 1, a BLUETOOTH device 100 includes a BLUETOOTH front end 140 and a processor 150. The processor 150 may be any suitable processing device, e.g., a microcontroller, microprocessor, digital signal processor (DSP), ASIC, etc.

Importantly, in accordance with the principles of the present invention, the BLUETOOTH device 100 includes a low RF power capability 110, in addition to its normal operating level RF level(s) 120. This is depicted in FIG. 1 by the selection of either the normal power level(s) control module 120 or the pairing low power level control module 110 to control the RF output of the BLUETOOTH front end 140. While this selection is shown in FIG. 1 by way of a switching function 130, this selection of course may be performed without the need for a physical switch, e.g., by software adjustment of a power level control register to the BLUETOOTH front end 140.

In the given embodiment, the pairing low power level control 110 directs the BLUETOOTH front end 140 to transmit at a power not exceeding that which provides a nominal range of no more than about, e.g., preferably 10 meters. Of course, much smaller ranges are possible and preferable, within the principles of the present invention.

Figure 2:
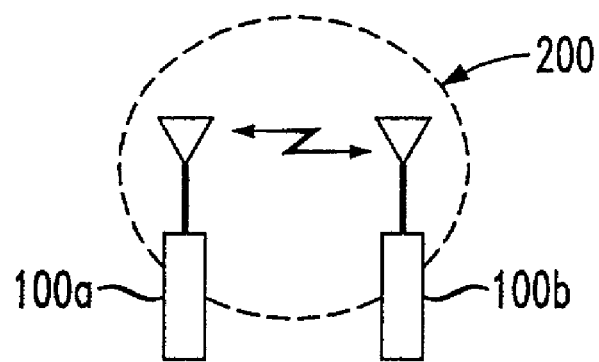
FIG. 2 depicts the very close range limit of BLUETOOTH devices pairing at low or extremely low powers, in accordance with the principles of the present invention.
Figure 2:
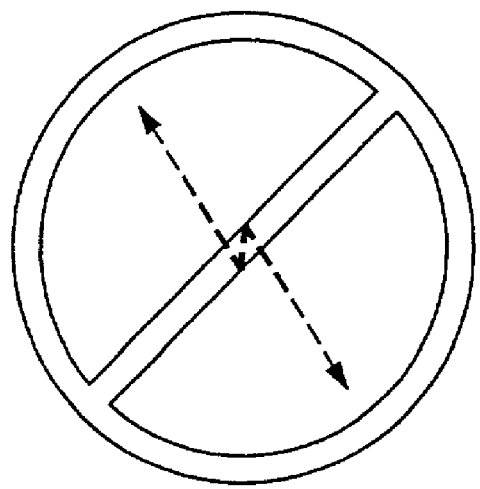
Figure 2:
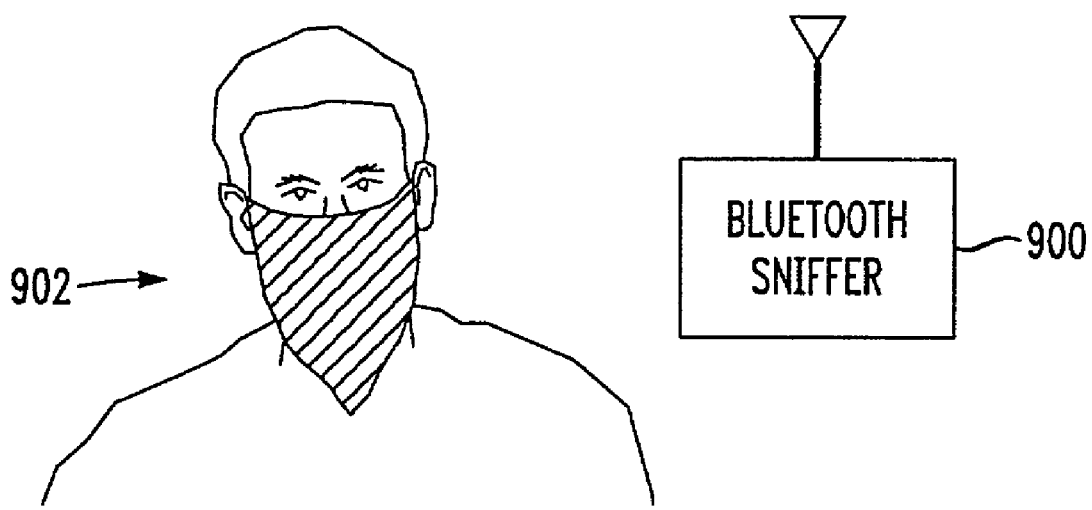

FIG. 2 depicts the very close range limit of BLUETOOTH devices pairing at low or extremely low powers, in accordance with the principles of the present invention.

Figure 9:
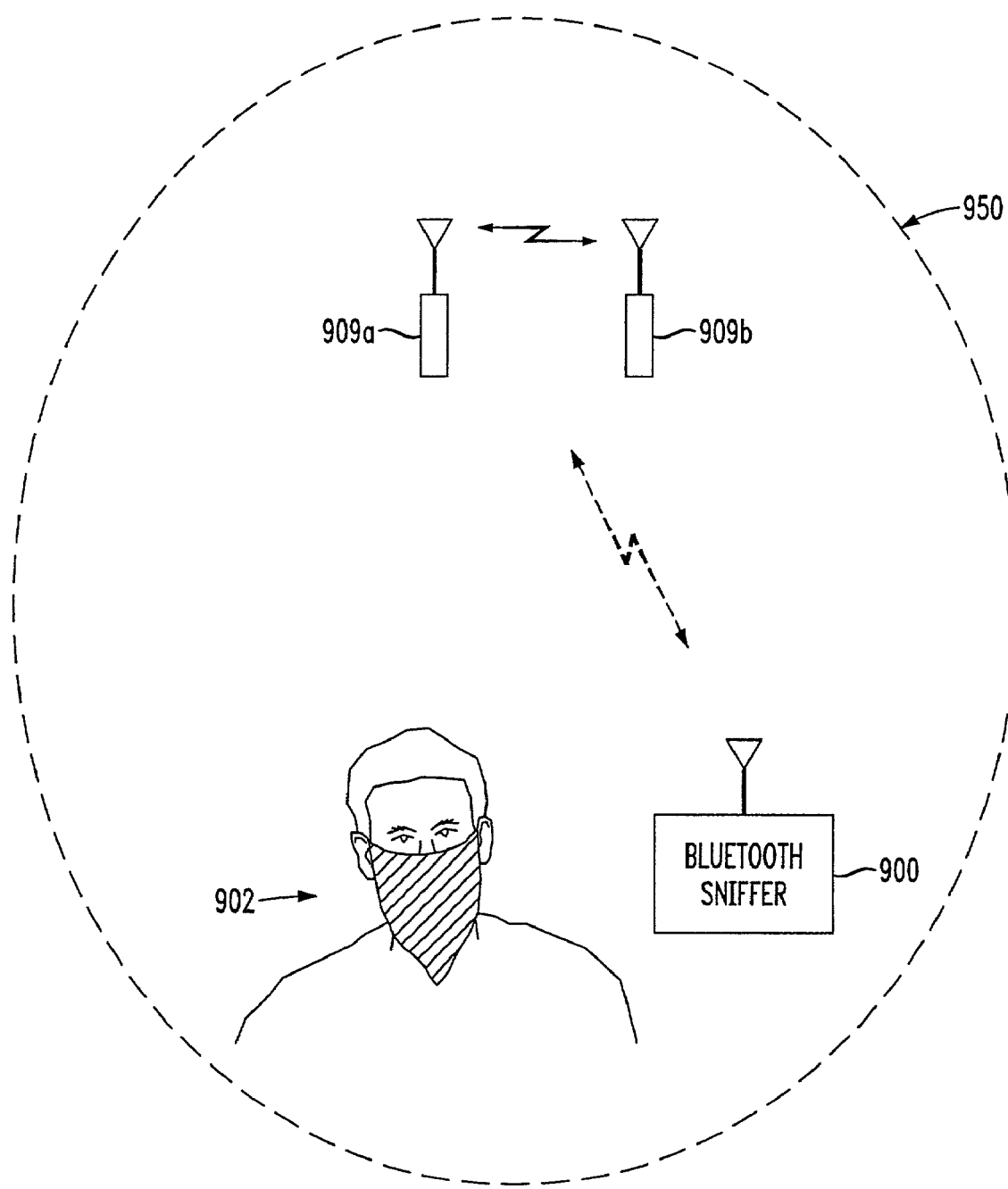
FIG. 9 depicts the range of wireless communications between two BLUETOOTH devices during conventional pairing operations.

In particular, in FIG. 2, the thief 902 who was otherwise able to intercept BLUETOOTH pairing transmissions of the conventional BLUETOOTH devices 909a, 909b shown in FIG. 9 is now foiled, because the much, much smaller range 200 of low power RF transmissions from the BLUETOOTH devices 100a, 100b during pairing operations (particularly when exchanging a key) in accordance with the principles of the present invention does not reach the BLUETOOTH sniffer 900 machine.

Figure 3:
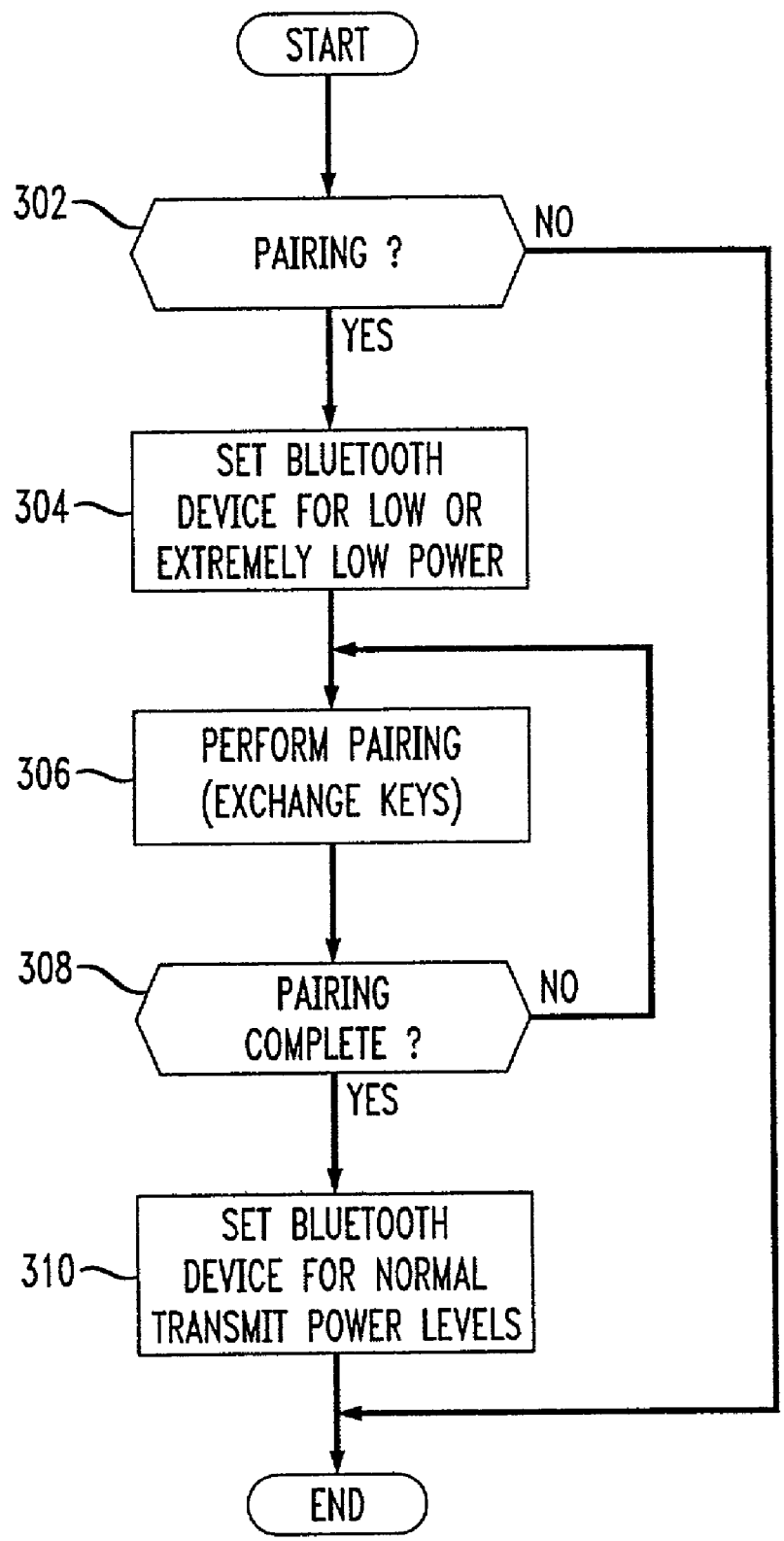
FIG. 3 is an exemplary process by which the BLUETOOTH device of FIGS. 1 and 2 is set to low or extremely low transmit power for pairing operations.

FIG. 3 is an exemplary process by which the BLUETOOTH device of FIGS. 1 and 2 is set to low or extremely low transmit power for pairing operations.

In particular, in step 302 of FIG. 3, it is determined whether or not a pairing operation is to be performed.

In step 304, the BLUETOOTH device is set for low transmission power. Alternatively, if provided, the BLUETOOTH device may be set to an 'extremely low' power, i.e., to a power below the lowest used for ordinary communications (and/or below those in the current BLUETOOTH specification).

In step 306, pairing operations are performed, including the exchange of data keys. In an alternative embodiment, the low power mode of the BLUETOOTH device may be used only to transmit a data key.

In step 308, it is determined whether or not the pairing operation has been completed. If not, the pairing process continues in step 306.

In step 310, once the pairing process using a low transmission power has been completed, the BLUETOOTH device is reset for normal communication activities at a normal power level.

In an alternative embodiment, a BLUETOOTH device may be required to transmit data keys (e.g., a link key) and/or other pairing operations over a temporary wired connection to another BLUETOOTH device.

In particular, a temporary physical or line-of-sight (e.g., Infrared) communication path (collectively referred to herein as 'physical' connection) may be required for pairing operations. The requirement for a temporary physical connection provides a secure connection between two (or more) BLUETOOTH devices during pairing operations, removing the need to transmit initial link keys over the air. This eliminates the possibility of interception of pairing signals by an unauthorized device, e.g., by a BLUETOOTH Sniffer.

Figure 4:
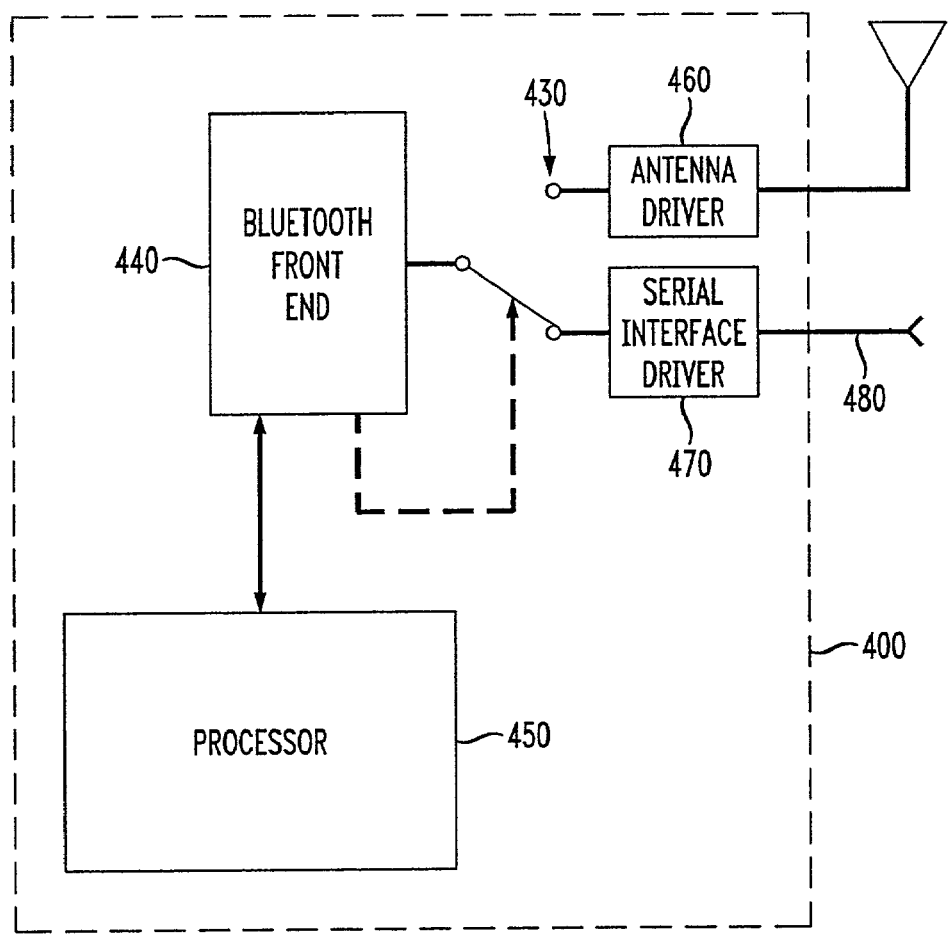
FIG. 4 shows another embodiment of the present invention wherein a BLUETOOTH device includes a physical or line-of-sight connector intended to provide temporary wired pairing operations with another BLUETOOTH device, in accordance with the principles of the present invention.

FIG. 4 shows another embodiment of the present invention wherein a BLUETOOTH device includes a physical or line-or-sight connector intended to provide temporary wired pairing operations with another BLUETOOTH device, in accordance with the principles of the present invention.

In particular, in FIG. 4, a BLUETOOTH device 400 includes a BLUETOOTH front end 440 which has the option of outputting data in RF form through an antenna driver 460, or through a serial interface driver 470 and associated serial interface 480. The selection of RF or digital data transmission is depicted by a selectable switching function 430, though the invention does not limit the selectability operation to a switch. For instance, a software setting such as in a register is suitable to change output options from the BLUETOOTH front end 440, in accordance with the principles of the present invention.

The physical connection can be a short electrical or optical cable, e.g., provided by the manufacturer of the BLUETOOTH device.

Figure 5:
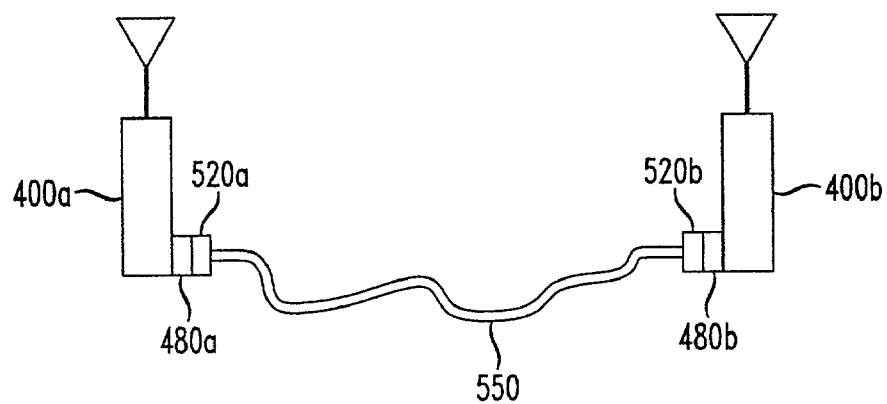
FIG. 5 depicts two BLUETOOTH devices as shown in FIG. 4 temporarily wired together to allow secure wired pairing therebetween.

FIG. 5 depicts two BLUETOOTH devices as shown in FIG. 4 temporarily wired together to allow secure wired pairing therebetween.

In particular, as depicted in FIG. 5, an electrical or optical cable 550 with connectors 520a, 520b may be connected between suitable and matching serial (or parallel) connectors 480a, 480b of the BLUETOOTH devices 400a, 400b, respectively.

Alternatively, the physical connection can be provided by a set of electrical contacts on one BLUETOOTH device that connects or meets with matching contacts on the other BLUETOOTH device. For instance, one BLUETOOTH device could include a pop-out connector that would not be visible under normal use, but which would extend to mate with the other BLUETOOTH device during the initial pairing operations.

The user can be prompted of the need to perform pairing operations, wait for confirmation of completion of the temporary physical connection (or monitor for it), and then perform the pairing operations only when the devices are physically connected.

In addition to providing extremely high security for the passage of data keys, the use of a physical connection between BLUETOOTH devices in a piconet to perform pairing operations reduces or eliminates the otherwise conventional hindrance associated with the higher level of technical expertise required by a user to properly initiate BLUETOOTH pairing.

Figure 6:
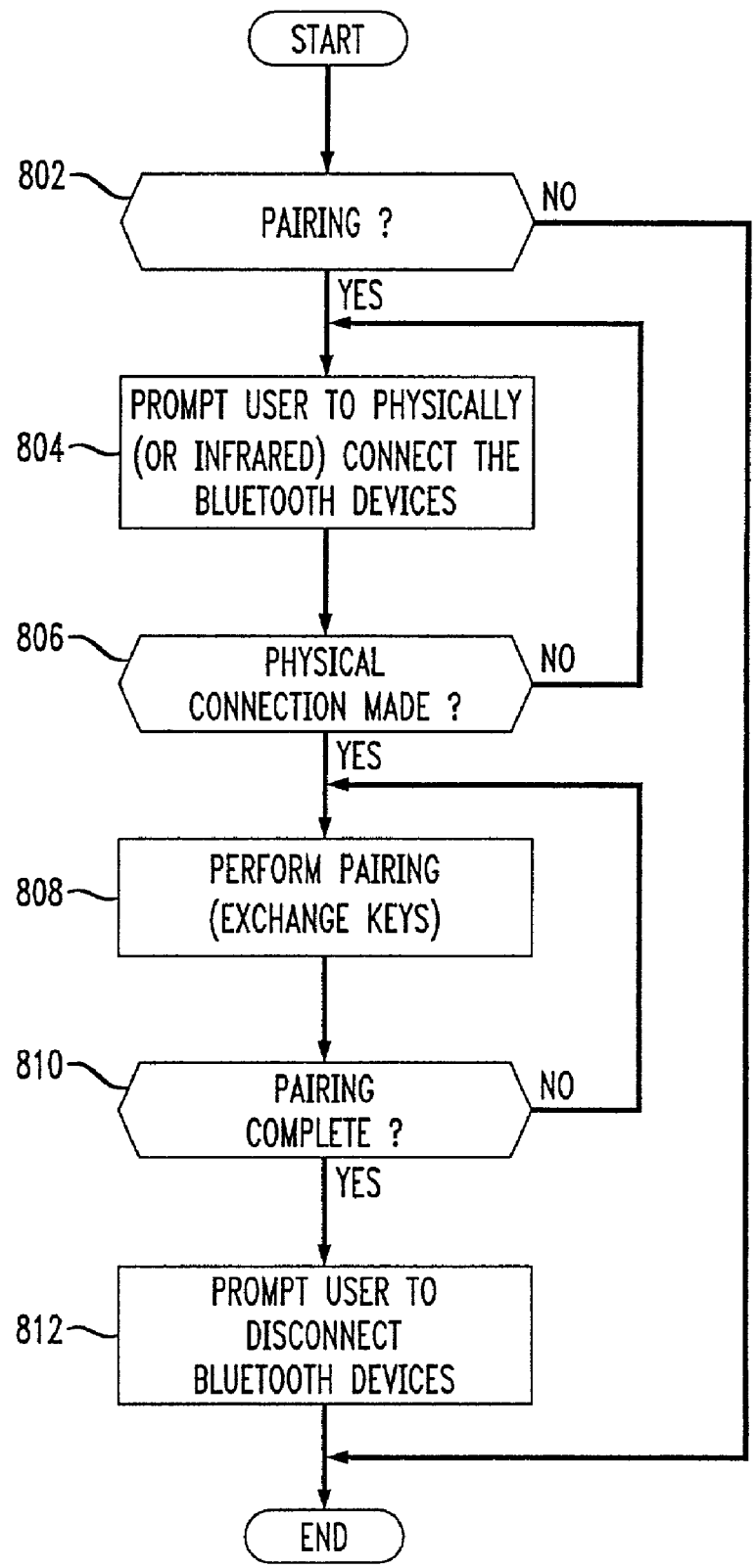
FIG. 6 shows an exemplary process by which the user of a BLUETOOTH device shown in FIG. 5 is prompted to provide the temporary physical or line-of-sight connection to allow pairing operations, in accordance with the principles of the present invention.
Figure 7:
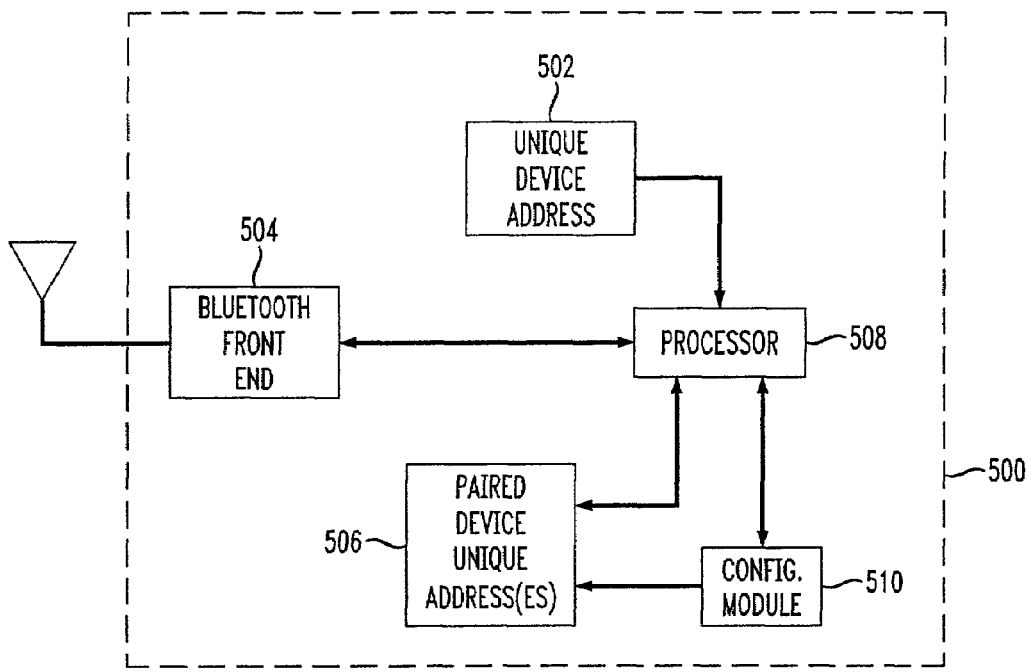
FIG. 7 depicts relevant features of a conventional BLUETOOTH device.
Figure 8:
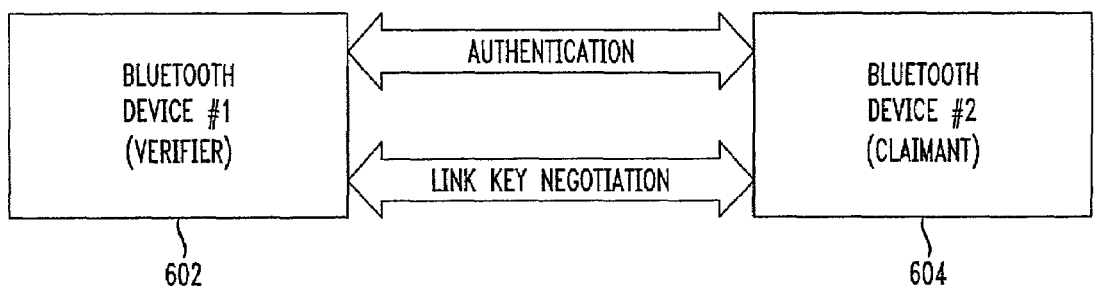
FIG. 8 depicts the authentication process and subsequent link key process between two conventional BLUETOOTH devices.

FIG. 6 shows an exemplary process by which the user of a BLUETOOTH device shown in FIG. 5 is prompted to provide the temporary physical or line-of-sight connection to allow pairing operations, in accordance with the principles of the present invention.

In particular, in step 802 of FIG. 6, it is determined whether or not a pairing operation is to be performed.

In step 804, the BLUETOOTH device prompts the user to physically connect the two (or more) BLUETOOTH devices to allow pairing operations to continue.

In step 806, a physical connection is made by the user between the two BLUETOOTH devices, either using a cable, direct connector-to-connector contact between the two BLUETOOTH devices, using a line-of-sight infrared connection, etc.

In step 808, the pairing operations are performed, including the exchange of data keys. In an alternative embodiment, the low power mode of the BLUETOOTH device may be used only to transmit a data key.

In step 810, it is determined whether or not the pairing operation has been completed. If not, the pairing process continues in step 808.

In step 812, once the pairing process using a low transmission power has been completed, the user is prompted to disconnect the physical connection or otherwise is instructed that normal wireless range operations may commence or continue.

Provision of a physical connection also opens up the possibility for an improved user experience while pairing. For instance, standard over-the-air pairing requires multiple steps by the user. One device needs to be placed in a pairable mode, while the other must be told to initiate pairing. It then scans for all devices and asks the user to select which one is the desired one. The user then must enter a PIN (this step may or may not still be desirable).

By supplying a physical connection, other user interaction can be removed. The user plugs in the cable into both devices. They communicate over the cable so that RF eavesdroppers are thwarted. They exchange device addresses, names, class, etc. They negotiate who generates the initial temporary link key. The link key is generated. The PINs are used to generate semikeys and finally, the link keys are verified by successfully linking over the air (but not exposing any keys to those near-by).

Of course, a cable is not the only implementation of this invention. For instance, suitable line-of-sight or near line-of sight devices could be used. An IrDA infrared link is an example of an alternative communication mechanism.

In another aspect of the invention, security in a BLUETOOTH device is enhanced by causing the RF front end of a first piconet device to transmit the data key along a directed path towards a second piconet device. Typically, the directed path is a straight line connecting the first piconet device to the second piconet device.

In known telecommunication systems, an RF front end transmits a signal to a receiving system. The RF front end transmits the signal in an outward radiating pattern from the RF front end. In comparison, under this aspect of the invention, the RF front end does not transmit the signal in an outward radiating pattern. Rather, the signal is transmitted along a linear path towards a receiver.

By directing the data key along a directed path from the first piconet device towards the second piconet device, the overall security of the system is increased. In order to effectively snoop the present embodiment, a BLUETOOTH snooper would be required to be positioned in a linear path directly between the first and second piconet devices. A BLUETOOTH snooper positioned merely in the vicinity of the first or second piconet devices would not effectively capture the transmitted data (e.g., the data key), unless the snooper is positioned along the directed path between the first and second piconet devices.

One of ordinary skill in the art will recognize that there are numerous ways to direct a transmission along a directed path. For instance, two or more antennas can be used to form a beam forming network that can direct a transmitted signal. Such a beam forming network would allow a first piconet device to securely connect to a second piconet device by pointing the first piconet device towards the second piconet device.

The present invention improves BLUETOOTH security during pairing, and reduces the possibility of identity impersonation and/or eavesdropping. Pairing operations become simpler because there need be less interaction by the user, leading to a reduced risk of error in the pairing.

The disclosed embodiments reduce or eliminate the risk of someone intercepting the RF data sent during pairing between two devices. Once pairing has finished, further risk of eavesdropping has been virtually eliminated. A first embodiment restricts the transmit power while link keys are being passed. A second embodiment replaces over the air link exchange with a physical electrical connection. This also removes the need of a user interface to initiate pairing. In any event, these two embodiments in particular solve problems associated with BLUETOOTH eavesdropping.

The disclosed embodiments reduce security weaknesses found in BLUETOOTH by reducing or removing the risk of eavesdropping during the insecure period of pairing. Invention 2 also removes the requirement of the user initiating the pairing process through buttons or menus on one or both devices, making it much easier to take advantage of the BLUETOOTH connection, yet it does not force a permanent pairing as fixed link keys would.

While the invention has been described with reference to the exemplary embodiments thereof, those skilled in the art will be able to make various modifications to the described embodiments of the invention without departing from the true spirit and scope of the invention.

What is claimed is:

1. A method of providing security during a pairing operation of a wireless network device, comprising:
    entering a low power pairing mode within said wireless network device, said wireless network device comprised of said low power pairing mode and a high power communications mode;
    receiving data associated with network establishment during said low power pairing mode; and
    rejecting said received data if transmitted with said high power communications mode;
    wherein said low power pairing mode is based upon a power level to allow close range communications with enhanced security.

2. The method of providing security during a pairing operation of a wireless network device according to claim 1, wherein:
    said network establishment is a pairing operation.

3. The method of providing security during a pairing operation of a wireless network device according to claim 1, wherein:
    said data includes link key information.

4. The method of providing security during a pairing operation of a wireless network device according to claim 1, wherein:
    said wireless network device is a BLUETOOTH piconet device.

5. A method for securely transmitting a data key from a wireless network device, comprising:
    transmitting with an RF front end of said wireless network device said data key to another network device during a pairing operation with a low power pairing mode;
    rejecting received data if transmitted with a high power communications mode; and
    after said data key has been transmitted, resetting said RF front end of said wireless network device to transmit with a high power communications mode.

6. The method for securely transmitting a data key from a wireless network device according to claim 5, wherein:
    said wireless network device is a piconet network device.

7. The method for securely transmitting a data key from a wireless network device according to claim 5, wherein:
    said low power level is lower than a lowest normal communication power level.

8. The method for securely transmitting a data key from a wireless network device according to claim 5, wherein:
    said wireless network device is a BLUETOOTH piconet device.

9. The method for securely transmitting a data key from a wireless network device according to claim 5, wherein:
    said RF front end is forced to transmit at said low power level during pairing operations between said wireless network device and said another wireless network device.

10. The method for securely transmitting a data key from a wireless network device according to claim 5, wherein:
    said RF front end of said wireless network device transmits said data key along a directed path towards another wireless network device.

11. Apparatus for providing security during a pairing operation of a wireless network device, comprising:
    means for entering a low power pairing mode within said wireless network device, said wireless network device comprised of said low power pairing mode and a high power communications mode;
    means for receiving data during said low power pairing mode; and
    means for rejecting said received data if transmitted with said high power communications mode;
    wherein said low power pairing mode is based upon a power level to allow close range communications with enhanced security.

12. The apparatus for providing security during a pairing operation of a wireless network device according to claim 11, wherein:
    said network establishment is a pairing operation.

13. The apparatus for providing security during a pairing operation of a wireless network device according to claim 11, wherein:
    said data is a link key.

14. The apparatus for providing security during a pairing operation of a wireless network device according to claim 11, wherein:
    said wireless network device is a BLUETOOTH piconet device.

15. Apparatus for securely transmitting a data key from a wireless network device, comprising:
    means for transmitting with an RF front end of said wireless network device said data key to another network device during a pairing operation with a low power pairing mode;
    rejecting received data if transmitted with a high power communications mode; and
    means for resetting said RF front end of said wireless network device to transmit at with a high power communications mode after said data key has been transmitted.

16. The apparatus for securely transmitting a data key from a device according to claim 15, wherein:
    said low power level is lower than a lowest normal communication power level.

17. The apparatus for securely transmitting a data key from a device according to claim 15, wherein:
    said wireless network device is a BLUETOOTH piconet device.

18. The apparatus for securely transmitting a data key from a wireless network device according to claim 15, wherein:
    said means for forcing said RF front end sets said RF front end to transmit at said low power level during pairing operations between said wireless network device and said another wireless network device.

* * * * *